(No Model.)

H. C. HOLL.
GLASS MONUMENT.

No. 394,650. Patented Dec. 18, 1888.

WITNESSES:
Harry Frease
Andrew J. Fulmer

INVENTOR
Henry C. Holl
BY
Bond + Wise
ATTORNEYS

UNITED STATES PATENT OFFICE.

HENRY C. HOLL, OF NEW BERLIN, OHIO, ASSIGNOR OF ONE-HALF TO LEVI A. STONER, OF SAME PLACE.

GLASS MONUMENT.

SPECIFICATION forming part of Letters Patent No. 394,650, dated December 18, 1888.

Application filed September 17, 1887. Serial No. 249,996. (No model.)

*To all whom it may concern:*

Be it known that I, HENRY C. HOLL, a citizen of the United States, residing at New Berlin, in the county of Stark and State of Ohio, have invented certain new and useful Improvements in Glass Monuments; and I do hereby declare that the following is a full, clear, and exact description of the same, reference being had to the annexed drawings, making a part of this specification, and to the letters and figures of reference marked thereon, in which—

Figures 1, 2:
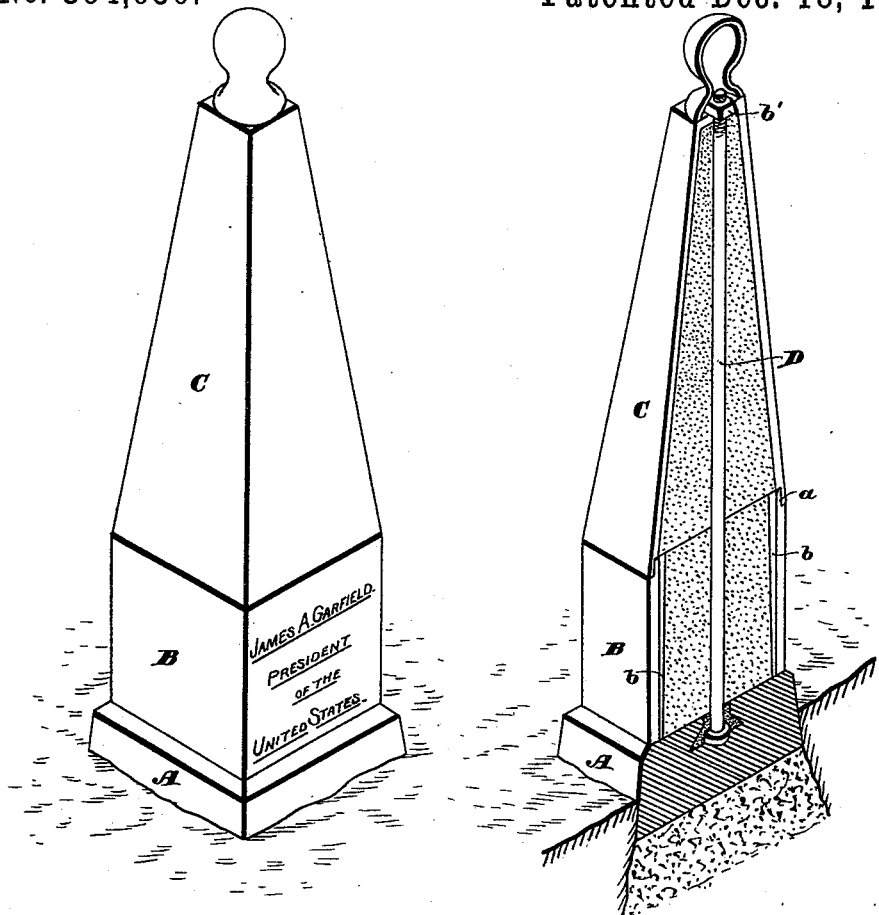
Figure 3:
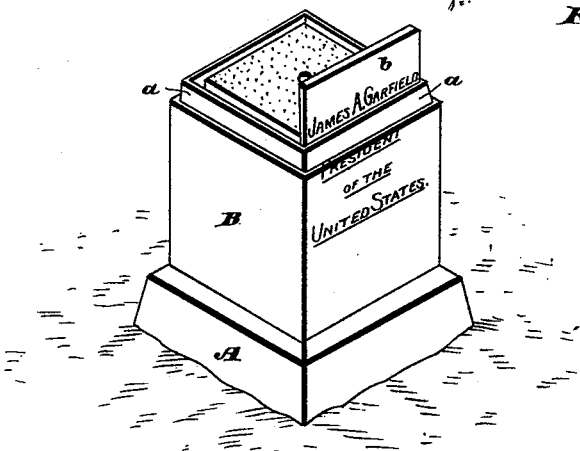

Figure 1 is an isometrical view. Fig. 2 is a longitudinal section. Fig. 3 is an isometrical view showing the spire and its urn removed and a tablet-plate partially elevated.

The present invention has relation to monuments; and it consists in the different parts and combination of parts hereinafter described, and particularly pointed out in the claim.

Similar letters of reference indicate corresponding parts in all the figures of the drawings.

In the accompanying drawings, A represents the first base, which is preferably formed of stone and is placed upon a proper foundation. On the top of the first base, A, is placed the second base, B. This second base is formed of glass and is hollow. The sides of this base B are formed of sufficient thickness to give it the desired amount of strength. The top or upper end of the second base, B, is provided with the flange $a$, which is formed integral with the base B and is for the purpose of receiving and holding the bottom or lower end of the spire C, as shown in Fig. 2. The spire C is also formed of glass and is hollow, its sides being of sufficient thickness to give it the desired strength. The top or upper end of the spire C is closed, as shown in Figs. 1 and 2. It will be understood that the second base, B, and the spire C may be of any desired size or style.

The base B and the spire C are filled with plaster-of-paris, artificial stone, or like material, which may be placed in said base and spire while in a plastic state and allowed to harden; or, if desired, the plaster-of-paris, artificial stone, or other material may be first molded and hardened in proper form and afterward placed within the base or spire.

The base B may be provided with a tablet-plate, $b$, located within each or any face of the base B, upon which tablet-plate may be placed the desired inscription. This inscription may be made of gold-leaf, paint, or any other desired material; or, if desired, the inscription may be upon paper, pasteboard, or like material and attached to the said tablet or tablets, or the inscription may be placed upon the inner side of the base B or spire C before said parts are filled. It will be seen that by the use of the tablets a new inscription may be placed in the proper position at any time subsequent to the erection of the monument proper.

In case the base B is filled with material while in a plastic state, the inner faces of the tablets should be coated with a non-adhesive substance, such as grease or wax, so as to prevent the filling from adhering to the tablets, thereby permitting the tablets to be removed for any desired purpose.

For the purpose of securely holding the different parts of the monument in proper position the rod or bar D is provided, and is located substantially as shown in Fig. 2. The top or upper end of this rod or bar is screw-threaded to receive the nut $b'$, as shown in Fig. 2. The bottom or lower end of this rod or bar D is provided with a head, which is formed integral with said rod or bar and placed in the base A substantially as shown in Fig. 2. For the purpose of securely holding said head in proper position melted metal may be poured around it and allowed to harden.

An urn or any other ornamental device may be placed upon the top or upper end of the spire C.

The material used in filling may be of any desired color or colors.

It will be understood that in order to remove the tablet $b$ the spire C must be removed. It will also be understood that a third or any desired number of bases may be used. The tablets $b$ are preferably formed tapering or wedge-shaped, in order to facilitate their removal and replacement; but I do not desire to be limited to this particular construction.

In case the material used as filling is liable to expand and contract by heat or cold, said filling should be first molded or formed into the desired shape a little smaller than the space to be filled by it, so as to leave small spaces between said filling and the different faces of the glass.

I am aware that heretofore a monument has been made of hollow glass having a base of stone, the parts of which are secured together by a rod passing through their center and screw-nutted at both ends, and that a monument has been made of hollow glass filled with plastic material; also, that a record-tablet has been made consisting of a glass case having a tapering recess for the reception of a tablet, which is secured in said case by a hermetically-sealed plug, and that I do not claim.

Having now fully described my invention, what I claim as new, and desire to secure by Letters Patent, is—

The combination of the spire C, the base B, each formed of hollow glass and filled with artificial stone or like material, the inscription-tablet $b$, coated upon its face coming in contact with the filling with a non-adhesive substance, and means for securing the base and spire together, substantially as and for the purpose specified.

In testimony that I claim the above I have hereunto subscribed my name in the presence of two witnesses.

HENRY C. HOLL.

Witnesses:
LEVI A. STONER,
L. C. WISE.